US012617705B2

(12) United States Patent
Nagar et al.

(10) Patent No.: US 12,617,705 B2
(45) Date of Patent: May 5, 2026

(54) APPLYING CHEMICAL OXYGEN DEMAND AND HEATING VALUE DIAGNOSTICS TO ENHANCE PERFORMANCE OF A SCWO PROCESS

(71) Applicant: 374Water Inc., Durham, NC (US)

(72) Inventors: Yaacov Nagar, Durham, NC (US); David Ballenghien, Romans-sur-Isère (FR); Marc Deshusses, Chapel Hill, NC (US)

(73) Assignee: 374WATER INC., Durham, NC (US)

( * ) Notice: Subject to any disclaimer, the term of this patent is extended or adjusted under 35 U.S.C. 154(b) by 747 days.

(21) Appl. No.: 18/059,834

(22) Filed: Nov. 29, 2022

(65) Prior Publication Data

US 2023/0166997 A1    Jun. 1, 2023

Related U.S. Application Data

(60) Provisional application No. 63/284,469, filed on Nov. 30, 2021.

(51) Int. Cl.
*C02F 11/08* (2006.01)
*A62D 3/20* (2007.01)
(Continued)

(52) U.S. Cl.
CPC .............. *C02F 11/086* (2013.01); *A62D 3/20* (2013.01); *C02F 1/008* (2013.01); (Continued)

(58) Field of Classification Search
CPC .. C02F 11/086; C02F 1/008; C02F 2209/001; C02F 2209/006; C02F 2209/02; (Continued)

(56) References Cited

U.S. PATENT DOCUMENTS

| | | | |
|---|---|---|---|
| 4,751,005 A | 6/1988 | Mitsui et al. | |
| 5,565,616 A | 10/1996 | Li et al. | |

(Continued)

FOREIGN PATENT DOCUMENTS

| | | |
|---|---|---|
| AU | 2015202300 A1 | 5/2015 |
| CN | 102295366 A | 12/2011 |

(Continued)

OTHER PUBLICATIONS

International Search Report and Written Opinion received for PCT/US2022/051269, mailed Mar. 15, 2023.

(Continued)

*Primary Examiner* — Terry K Cecil
(74) *Attorney, Agent, or Firm* — Greer, Burns & Crain, Ltd

(57) ABSTRACT

A system for on-line monitoring of a supercritical water oxidation (SCWO) process, the system including an SCWO reactor, a feedstock supply line which supplies a feedstock to the SCWO reactor, an oxidant supply line which supplies an oxidant to the SCWO reactor, at least one sensor which measures at least one parameter of the feedstock and the oxidant, and a controller which determines a Chemical Oxygen Demand (COD) and a Heating Value (HV) of the feedstock based on the at least one parameter, such that the controller adjusts the amount of the oxidant supplied to the SCWO reactor based upon the COD and the HV of the feedstock.

15 Claims, 3 Drawing Sheets

(51) Int. Cl.
*A62D 101/20* (2007.01)
*C02F 1/00* (2023.01)

(52) U.S. Cl.
CPC .... *A62D 2101/20* (2013.01); *C02F 2209/001* (2013.01); *C02F 2209/006* (2013.01); *C02F 2209/02* (2013.01); *C02F 2209/03* (2013.01); *C02F 2209/08* (2013.01); *C02F 2209/225* (2013.01); *C02F 2209/38* (2013.01); *C02F 2209/40* (2013.01)

(58) Field of Classification Search
CPC .............. C02F 2209/03; C02F 2209/08; C02F 2209/225; C02F 2209/38; C02F 2209/40; C02F 2209/005; C02F 2209/04; A62D 3/20; A62D 2101/20; Y02W 10/20
See application file for complete search history.

(56) References Cited

U.S. PATENT DOCUMENTS

| | | | |
|---|---|---|---|
| 5,620,610 | A | 4/1997 | Ishii et al. |
| 5,770,174 | A | 6/1998 | Eller et al. |
| 5,837,149 | A | 11/1998 | Ross et al. |
| 6,171,509 | B1 | 1/2001 | Mcbrayer, Jr. et al. |
| 6,238,568 | B1 | 5/2001 | Hazlebeck |
| 6,519,926 | B2 | 2/2003 | Hazlebeck |
| 9,328,008 | B2 | 5/2016 | Wang et al. |
| 10,688,464 | B2 | 6/2020 | Hong et al. |
| 2009/0266772 | A1 | 10/2009 | Fernandez et al. |
| 2020/0277213 | A1 | 9/2020 | Nagar et al. |

FOREIGN PATENT DOCUMENTS

| | | | |
|---|---|---|---|
| CN | 102477312 | A | 5/2012 |
| CN | 101905935 | B | 7/2012 |
| CN | 205035148 | U | 2/2016 |
| CN | 105399178 | A | 3/2016 |
| CN | 105797249 | A | 7/2016 |
| CN | 107601643 | A | 1/2018 |
| CN | 109264892 | A | 1/2019 |
| CN | 109851128 | | 6/2019 |
| CN | 112275248 | A | 1/2021 |
| CN | 112390343 | A | 2/2021 |
| CN | 111573819 | B | 4/2022 |
| DE | 19640452 | A1 | 10/1997 |
| JP | 2001079571 | A | 3/2001 |
| JP | 2002001088 | A | 1/2002 |
| JP | 2002273459 | A | 9/2002 |
| JP | 2002355700 | A | 12/2002 |
| JP | 3426110 | B2 | 7/2003 |
| JP | 4344458 | B2 | 10/2009 |
| RU | 2699118 | C2 | 9/2019 |
| WO | 1991011394 | A1 | 8/1991 |
| WO | 1992021621 | A1 | 12/1992 |
| WO | 1998047822 | A1 | 10/1998 |
| WO | 2014178831 | A1 | 11/2014 |
| WO | 2019040277 | A1 | 2/2019 |
| WO | 2019079687 | A1 | 4/2019 |

OTHER PUBLICATIONS

AET, "COD (Chemical Oxygen Demand)—Indicator for water pollution, " blog, retrieved from the Internet: https://www.aqua-equip.com/cod-chemical-oxygen-demand-indicator-for-water-pollution/, published Jun. 11, 2019, 4 pages.

Korth, B., et al., "Estimating Energy Content of Wastewater Using Combustion Calorimetry and Different Drying Processes," Original Research Article, Front. Energy Res., Sep. 19, 2017, 21 pages.

$T_A$: Air Temperature at Reactor Inlet (°C)

$\dot{m}_A$: Air Mass Flow rate (kg/s)

$T_F$: Feedstock Temperature at Reactor Inlet (°C)

$\dot{m}_F$: Feedstock Mass Flow Rate (kg/s)

$P$: Pressure (psi)

$HV$: Feedstock Heating Value (MJ/kg)

$\Phi$: Heat Losses (kW)

APPLYING CHEMICAL OXYGEN DEMAND AND HEATING VALUE DIAGNOSTICS TO ENHANCE PERFORMANCE OF A SCWO PROCESS

RELATED APPLICATION

The present application is a Non-Provisional of, and claims 35 U.S.C. 119 priority from, U.S. Patent Application Ser. No. 63/284,469 filed Nov. 30, 2021, the entire contents of which are incorporated by reference herein.

BACKGROUND

Waste processing remains an important priority in today's society, and especially as it relates to waste which includes organic material. This waste includes sludge, which is a slurry, liquid waste, and waste with a large organic material component. One way of dealing with this waste is through treatment utilizing supercritical water oxidation (SCWO) technology. A reaction utilizing SCWO technology involves reacting the waste with air at temperatures and pressures above the critical point of water (374° C., 221 Bar) to convert all of the organic matter of the waste into clean water and carbon dioxide ($CO_2$) in a short period of time. Under these conditions, organic matter is typically oxidized at high reaction rates, resulting in complete conversion of the organic matter to $CO_2$, and usable water at reaction times as short as a few seconds.

The resulting water is divided into two streams, one mineral and one distilled water. The mineral stream contains suspended and dissolved inorganic minerals, and can optionally be utilized as fertilizer, following further processing. One beneficial feature of using SCWO technology is that the continuous process utilizes the energy embedded in the waste. When the energy balance is positive, this feature allows the units to operate off-the-grid while increasing the system's resiliency. Another benefit is that SCWO systems are more compact compared to other organic waste processing technologies. Further, it is possible to provide a system that normally does not require any reagents or consumables to operate, and that requires no additional external energy other than the initial energy embedded in the waste undergoing treatment and the initial heat provided to the system.

SCWO has been successfully applied to the destruction of problematic contaminants such as chemical weapons, PCBs, chlorinated solvents, coking wastewater, landfill leachate, oily wastes, PFAS, and dye-house wastewater. Unlike other hydrothermal treatment which generally produces an effluent liquid requiring additional processing prior to disposal, SCWO treatment yields relatively clean water. Moreover, formation of NOx, SOx, and other usual by-products of combustion is significantly reduced because of the relatively low process temperatures and water medium of the reaction the unique properties of the medium in which the reaction takes place.

One drawback of SCWO processes is that a significant amount of power is consumed by the air compressor to compress air from ambient pressure to above 3200 psi. This compressed air is the source of oxygen in the process, which needs to be provided in sufficient quantities to attain proper treatment of the waste. Additionally, maintaining an adequate air to feedstock ratio is important to achieving proper performance and improved operation of the SCWO process. Further, co-fuel, which is added on demand to the feedstock streams to control the reactor temperature, also contains oxygen demand which must be taken into account when determining the air to feedstock ratio.

While maintaining an adequate air to feedstock ratio is important, just as important is the speed with which the system can react to achieve the needed air to feedstock ratio. In particular, delay between the reaction and the analysis of the corresponding vent-gas results in process control challenges which may cause suboptimal performance of the system. Using a traditional feedback control loop of the vent stream in an industrial scaled system might introduce a 5-10 minute lag and any sudden change in feedstock Chemical Oxygen Demand (COD) would remain unnoticed for that same amount of time, thereby delaying corrective action.

Accordingly, the lag in adjusting the air to feedstock ratio presents the risk that the system will have insufficient oxygen, causing incomplete oxidation and generation of unwanted by-products such as carbon monoxide, methane, etc. Also, excess oxygen often results in excessive power consumption. Therefore, there is a need for an alternative, feedforward and rapid method for COD estimation in a SCWO process, especially a method that enables fast corrective actions.

SUMMARY

The above-listed need is met or exceeded by the present method which uses a SCWO process for monitoring Chemical Oxygen Demand (COD) and Heating Value (HV) of feedstock. Moreover, the particular HV, whether it is a Lower Heating Value (LHV) or a Higher Heating Value (HHV) is not important, as long as the same HV is consistently used by the method. In particular, the present system provides a SCWO process which incorporates a feedstock COD monitor and an HV monitor, both of which operate in real-time. These monitors generate estimated values which are used for improved process control and pretreatment control. Specifically, a control device for the SCWO system utilizes the estimated values generated by the monitors to adjust the inputs into the SCWO system, thereby improving performance.

HV estimation relies on mass flow rates and temperatures at the reactor inlet and inside the reactor. Accordingly, with an HV monitor, there is no need to wait until a reacted volume of flow reaches a vent located near or at the system outlet. Between the reactor and the vent, there are several heat exchangers and pressure vessels, as well as connecting piping. This assembly creates a significant residence time which causes a delay between the reactor and analysis of the vent gas. The HV is correlated back to the COD for a given feedstock or feedstock category. Further, the COD monitor offers a direct COD measurement, while the HV monitor offers a quick surrogate through the HV-COD correlation, allowing a swift response to a change in feedstock properties.

Moreover, the feedstock COD value is a practical measure for readily controlling the oxygen or air mass flow rate, while monitoring the feedstock HV is advantageous in tuning the pretreatment and co-fuel or water addition.

The ability to quickly estimate a given feedstock's HV based only on temperature, pressure and mass flow rate values provides the ability to respond quickly to a sudden surge in calorific value, to adjust the air to feedstock ratio, or even derate the system to maintain the reactor temperature within acceptable limits Additionally, the ability to adjust the pretreatment allows for maintaining the feedstock's calorific value within the adequate range to ensure the desired system performance. Moreover, the presently disclosed method improves the energy consumption for the SCWO process, as all the elements of the SCWO reactor are used to the extent necessary to suit the particular conditions. Further, the present method optionally provides early warnings and quantitative outputs for proper operation of the feedstock pretreatment process.

In particular, SCWO processes require an oxidant or oxidants present in stoichiometric excess to achieve adequate treatment performance. As a result, obtaining a sufficient ratio of oxidant to feedstock is important to achieving satisfactory performance of the SCWO reactor. In theory, directly determining the COD for feedstock is achieved with a simple oxygen mass balance calculation, namely determining the difference between the inlet oxygen mass flow rate and outlet oxygen mass flow rate of the SCWO reactor and dividing this value by the inlet feedstock mass flow rate.

The SCWO reactor requires a certain amount of oxygen to completely mineralize the organic material in the feedstock, the ultimate performance goal of the reactor. Mineralization is the conversion of organic material to water and $CO_2$. Complete mineralization of the organic material within the feedstock helps prevent the creation of harmful byproducts of the SCWO processing system, such as CO, $CH_4$ and VOCs. Therefore, the SCWO processing system needs sufficient oxygen to achieve complete mineralization of the feedstock. However, providing too much oxygen to the SCWO reactor results in additional power consumption and wear on the compressor.

The simple oxygen mass balance equation does not account for the delay between when the reaction within the SCWO reactor takes place and when the analysis of the gas effluent stream generated by the SCWO reactor occurs. This delay, which is typically between 5-10 minutes depending on the SCWO system, results in suboptimal treatment.

For example, the SCWO reactor operates for several minutes unnoticed before it is realized that the system is running with insufficient oxygen to allow a complete oxidation reaction. There is a corresponding delay in the adjustment of the air compressor speed and air excess ratio, which, in turn, causes the SCWO reactor to be oxygen lean during the time lapse, resulting in suboptimal treatment of the feedstock. As such, a method that estimates the COD of the feedstock without waiting for the effluent to reach the gas effluent sensors improves efficiency of the SCWO reactor.

Accordingly, a benefit of the presently disclosed method is the ability to use the COD-HV relationship as an estimation for the COD of the feedstock. The present method determines the COD for a given feedstock at a time at which the feedstock enters the reactor based on the COD value of the feedstock as it leaves the system. In other words, the method determines what the COD value for the feedstock was prior to when the measurement is being made. Then, this calculated COD value is compared to the measured HV of the feedstock at the time when it enters the reactor. The derived COD-HV relationship, in combination with the measured HV allows estimation of the COD value. In this way, the HV, which can be determined nearly instantaneously, such as in a matter of seconds, is used to estimate the COD of the feedstock almost in real time. The HV calculation is based on temperature and mass flow rates, and will update in a few seconds to tens of seconds, whereas the COD calculated directly from the oxygen mass balance takes several minutes to calculate.

The COD-HV relationship is feedstock-dependent to a certain extent and is preferably continuously calibrated. Accordingly, the present method essentially calculates two distinct COD values, namely the COD derived from HV, which is calculated faster and relies on the COD-HV relationship, and the COD calculated through oxygen mass balance between inlet and outlet, which suffers from the residence time delay but is accurate at steady state. The COD calculated through the oxygen mass balance is needed to continuously update the COD-HV relationship. At steady state, both COD values tend to converge.

More specifically, the present disclosure includes a system for on-line monitoring of a supercritical water oxidation (SCWO) process, the system including an SCWO reactor, a feedstock supply line which supplies a feedstock to the SCWO reactor, an oxidant supply line which supplies an oxidant to the SCWO reactor, at least one sensor which measures at least one parameter of the feedstock and the oxidant, and a controller which determines a Chemical Oxygen Demand (COD) and a Heating Value (HV) of the feedstock based on the at least one parameter, such that the controller adjusts the amount of the oxidant supplied to the SCWO reactor based upon the COD and the HV of the feedstock.

In a preferred embodiment, the COD is determined based on an oxygen mass balance calculation performed by the controller, and the controller uses the COD and the HV of the feedstock to determine a COD-HV relationship for the feedstock. Preferably still, the controller uses the COD-HV relationship to generate a HV derived COD, such that the HV derived COD is used by the controller to adjust the amount of the oxidant supplied to the SCWO reactor.

In another preferred embodiment, the system for on-line monitoring of a SCWO process also includes a co-fuel supply line which supplies a co-fuel to the SCWO reactor, and at least one sensor which measures at least one parameter of the co-fuel, wherein the controller adjusts the amount of the co-fuel and/or water addition based on the HV of the feedstock. Preferably still, the system includes at least one heat exchanger which transfers heat from an effluent of the SCWO reactor to at least one of the oxidant and the feedstock.

In yet another preferred embodiment, the at least one sensor includes a mass flow rate meter, a mass flowmeter, a temperature sensor, a pressure sensor, and an oxygen sensor, such that the at least one sensor measures at least one parameter for at least one of the feedstock, the oxidant; and the SCWO reactor effluent. Preferably still, the controller calculates the COD and the HV of the feedstock periodically, the controller iteratively adjusting the supply of the oxidant.

In another preferred embodiment, the system for on-line monitoring of a SCWO process includes a phase separator which separates an effluent of the SCWO reactor into a liquid effluent and a gas effluent, such that the at least one sensor includes at least one of a gas effluent flow rate meter, a gas effluent oxygen sensor, and a gas effluent temperature sensor.

In yet another preferred embodiment, the system for on-line monitoring of a SCWO process includes a supply regulator for the feedstock, and a supply regulator for the oxidant, such that the supply regulators are connected to the controller, and the controller adjusts the amount of the feedstock and the oxidant supplied to the SCWO reactor by sending a control signal to the supply regulators.

In a preferred embodiment, the controller determines the COD of the feedstock based on the following Equation 1 and the controller determines the HV of the feedstock based on the following Equation 2. The following Equation 1 is:

$$OMF \dot{m}_{Ox}(t_0) - \dot{m}_{FD}(t_0)COD_{FD}(t_0) - \dot{m}_{CF}(t_0)COD_{CF}(t_0) =$$

$$\dot{Q}_G(t_0 + \tau)\frac{1}{V_M(t_0 + \tau)}O_{2_G}(t_0 + \tau)M_{O_2}$$

and the following Equation 2 is $$(\dot{m}_O + \dot{m}_{FD})h(x_i, T_R, P) = \dot{m}_O h(x_i, T_O, P) + \dot{m}_{FD}h(x_k, T_{FD}, P) + \dot{m}_{FD}HV - \Phi$$

where, the indexes FD, CF, Ox and G stand respectively for the feedstock, the co-fuel, the oxidant, and a gas effluent of the SCWO reactor; OMF stands for the oxygen mass fraction in the oxidant; $\dot{m}_*$ stands for the mass flow rate of stream $*$; $COD_*$ stands for the COD of stream $*$; $\dot{Q}_G$ stands for the volumetric flow rate of the gas effluent stream; $O_{2_G}$ stands for the oxygen volumetric concentration of the gas effluent stream; $V_M$ stands for the molar volume of the gas effluent stream; $M_{O_2}$ stands for oxygen molar mass; $\tau$ stands for the system residence time; $t_0$ stands for the timestamp to which the COD values refer; h stands for the specific enthalpy function; $x_i$ stands for the mass fraction of compound i, where i varies over the list of all the compounds; $T_*$ stands for the temperature of stream $*$; P stands for pressure; and $\Phi$ stands for the heat losses within the SCWO system.

A second embodiment of the present disclosure includes a method for an on-line monitoring of a supercritical water oxidation (SCWO) process, where the method includes supplying a feedstock and an oxidant to an SCWO reactor, measuring at least one parameter of the feedstock and the oxidant with at least one sensor, determining, with a controller, a Chemical Oxygen Demand (COD) and a Heating Value (HV) of the feedstock based on the at least one parameter, and adjusting the supply of the oxidant based on the COD and the HV of the feedstock.

DETAILED DESCRIPTION

Figure 1:
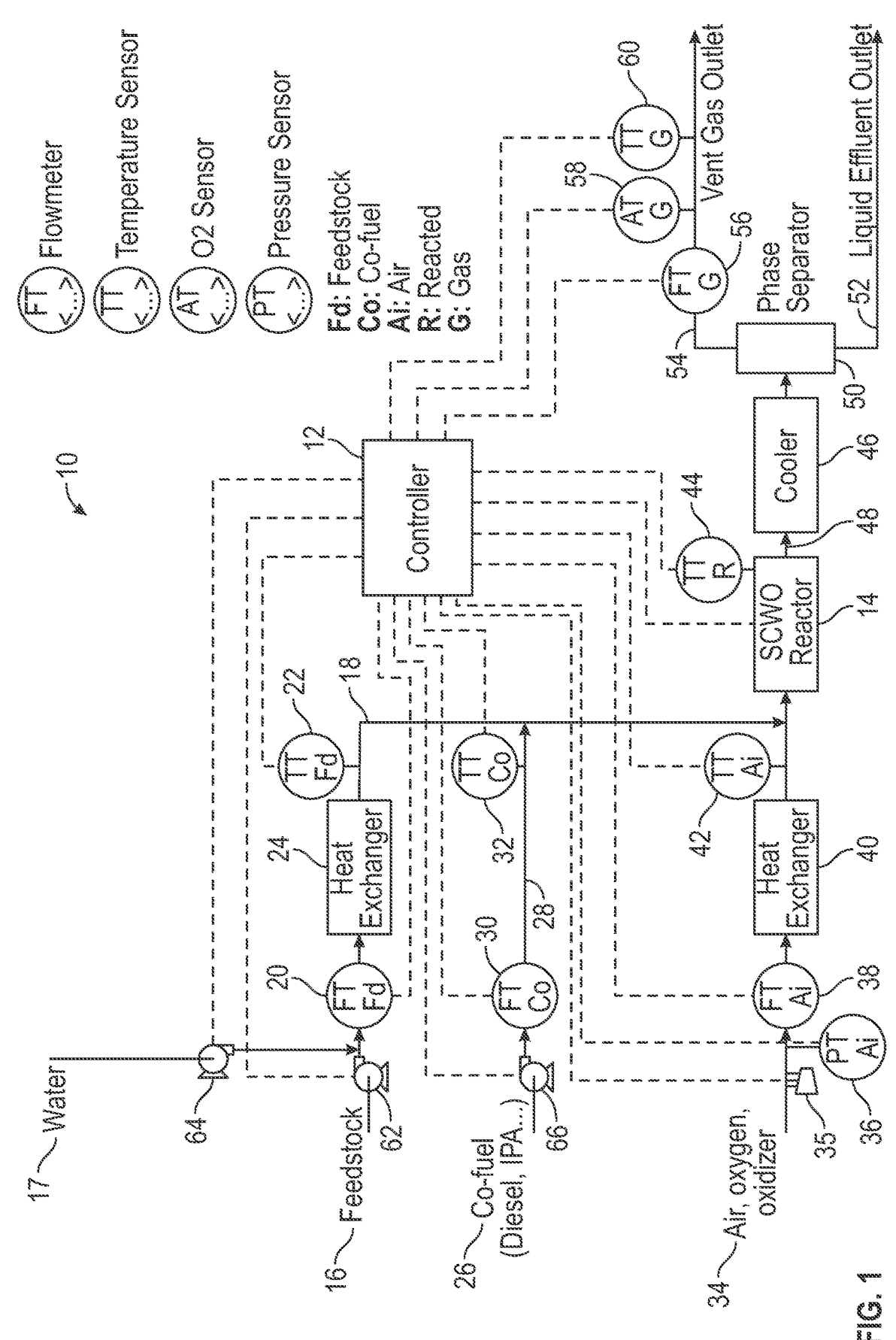
FIG. 1 is a schematic of a supercritical water oxidation (SCWO) processing system which implements the present method for on-line monitoring of a SCWO process using Chemical Oxygen Demand (COD) and Heating Value (HV) of feedstock.
Figure 2:
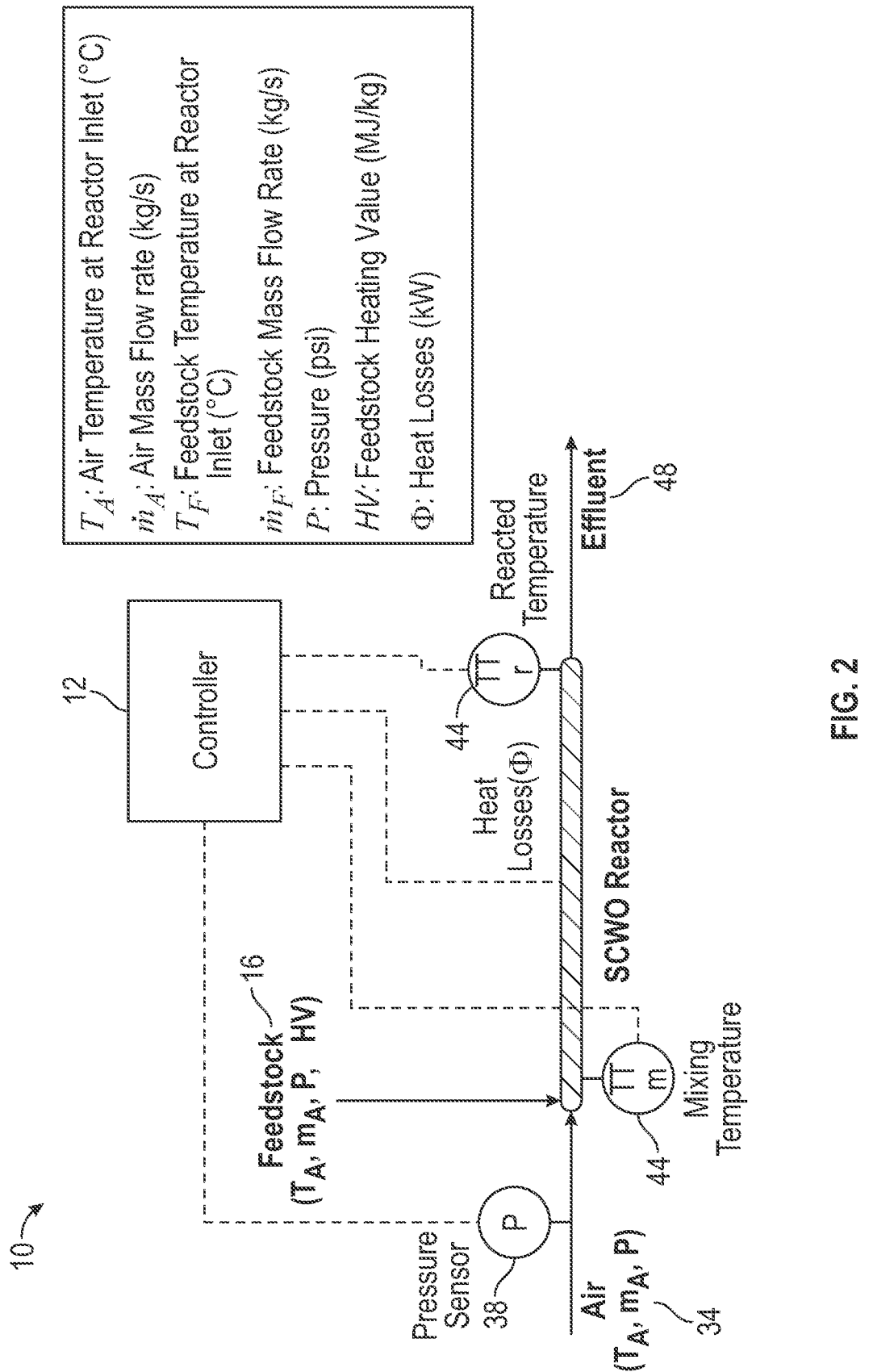
FIG. 2 is a schematic depicting the present method for on-line monitoring of a SCWO process using Chemical Oxygen Demand (COD) and Heating Value (HV) of feedstock.

Referring now to FIGS. 1-2, the present supercritical water oxidation (SCWO) processing system is generally labeled 10 and includes a controller 12 and a SCWO reactor 14. Additionally, feedstock 16 and water 17 are supplied to the SCWO reactor 14 by way of at least one feedstock line 18. Water 17 is optionally used to dilute the feedstock 16.

Optionally, the feedstock supply line 18 is split into several streams and fed to the SCWO reactor 14 at multiple points. In particular, the feedstock supply line 18 optionally includes at least two feedstock tees (not shown) which supply the feedstock 16 and the water 17 directly to the SCWO reactor 14. In a preferred embodiment, the SCWO system 10 includes between two and ten feedstock tees.

Further, a feedstock mass flow rate meter 20 and a feedstock temperature sensor 22 measure the mass flow rate and temperature of the feedstock 16, respectively, and provide the measured values to the controller 12. Preferably, the feedstock 16 is generally preheated to approximately 100-300° C. Moreover, the feedstock 16 travels through a feedstock heat exchanger 24, which preheats the feedstock 16. While FIG. 1 depicts the feedstock flow rate sensor 20, the feedstock heat exchanger 24 and the feedstock temperature sensor 22 in one example configuration, it is understood that any configuration of the feedstock flow rate sensor 20, the feedstock heat exchanger 24 and the feedstock temperature sensor 22 is appropriate as is known in the art. After passing through the feedstock flow rate sensor 20, the feedstock heat exchanger 24 and the feedstock temperature sensor 22, the feedstock 16 is provided to the SCWO reactor 14.

In addition to the feedstock 16, co-fuel 26 is supplied to the SCWO reactor 14 by a co-fuel supply line 28. The co-fuel 26 is a chemical with a high calorific value, fed to the process in a minimum amount to complement the feedstock's 14 calorific value. Preferably, the co-fuel 26 is mixed with the feedstock 14 or is supplied to the SCWO reactor 14 separately. Typical examples of the co-fuel 26 include alcohols, hydrocarbons, neat compounds or blends. Waste streams such as grease, spent motor oils, and spent lubricating fluid are also appropriate for use as the co-fuel 26. For the purpose of the HV-COD monitoring method, the co-fuel 26 HV needs to be known relatively precisely, which would be the case with co-fuels 26 such as diesel, alcohols and alcohol blends.

Before reaching the SCWO reactor 14, the temperature and mass flow rate of the co-fuel 26 are measured by a co-fuel mass flow rate meter 30 and a co-fuel temperature sensor 32, respectively, and the measured values are sent to the controller 12. The co-fuel 26 has a low flow rate and is generally not preheated. Preferably, the co-fuel 26 is provided at ambient temperature. The pressure range of the co-fuel 26 is that of the feedstock 16, which is typically between approximately 3200-4400 psi. Further, an oxidant 34, such as air, pure oxygen, hydrogen peroxide ($H_2O_2$), Ozone ($O_3$) or other oxidant as is known in the art, is supplied to the SCWO reactor 14 by a compressor 35. The oxidant 34 is a substance that acts or is used as an oxidizing agent.

Moreover, the compressor 35 is connected to the controller 12, such that the controller 12 adjusts the mass flow rate for the oxidant 34.

Between the compressor 35 and the SCWO reactor 14 are an oxidant pressure sensor 36, an oxidant mass flow rate meter 38, an oxidant heat exchanger 40, and an oxidant temperature sensor 42, all of which are connected to the air flow line. In a preferred embodiment, the oxidant heat exchanger 40 preheats the oxidant 34 before reaching the SCWO reactor 14. Additionally, the oxidant pressure sensor 36, the oxidant mass flow rate meter 38, and the oxidant temperature sensor 42 measure the pressure, mass flow rate, and temperature of the oxidant 34, respectively, and send the measured values to the controller 12. The oxidant 34 is preferably preheated to approximately 400-600° C. The pressure range for the oxidant 34 is preferably the same as the feedstock 16, which is approximately 3200-4400 psi. While FIG. 1 depicts the oxidant pressure sensor 36, the oxidant flow rate sensor 38, the oxidant heat exchanger 40 and the oxidant temperature sensor 42 in one example configuration, it is understood that any configuration of the oxidant pressure sensor 36, the oxidant flow rate sensor 38, the oxidant heat exchanger 40 and the oxidant temperature sensor 42 is appropriate as is known in the art.

Further, a SCWO reactor temperature sensor 44 measures the temperature within the SCWO reactor 14. While only one SCWO reactor temperature sensor 44 is depicted in FIG. 1, it is understood that multiple SCWO reactor temperature sensors 44 are optionally employed by the system 10. In an embodiment, the feedstock 16, the co-fuel 26 and the oxidant 34 mix within the SCWO reactor 14. Alternatively, the feedstock 16, the co-fuel 26 and the oxidant 34 mix before reaching the SCWO reactor 14 in a mixing tee or mixing zone (not shown) and are provided as a mixture to the SCWO reactor 14. It is also contemplated that two or more mixers are optionally used in mixing the inputs into the SCWO reactor 14. Further, active mixers are operated by the controller 12, or in the case of passive mixers, operation by the controller is not required.

The temperature measured by the SCWO reactor sensor 44 is relayed to the controller 12. Optionally, a SCWO reactor input pressure sensor (not shown) measures the pressure within the SCWO reactor 14 and sends the information to the controller 12. Alternately, a similar function is optionally performed by the oxidant pressure sensor 36 which provides an estimated pressure of the SCWO reactor 14.

Additionally, a cooler 46 is connected downstream of the SCWO reactor 14 and transfers heat from a reactor effluent 48 of the SCWO reactor 14 to either the feedstock 16, the oxidant 34, or both. Multiple heat transferring devices are contemplated. Further, a phase separator 50 separates the reactor effluent stream 48 into a liquid effluent stream 52 and a gas effluent stream 54. Additionally, a gas effluent stream mass flow rate meter 56, a gas effluent stream oxygen sensor 58, a gas effluent stream temperature sensor 60 and/or a volumetric flow meter (not shown) measure the mass flow rate, oxygen content, and temperature of the gas effluent stream 56, respectively, and send the measured information to the controller 12. Further, the liquid effluent stream 52 optionally passes through either the feedstock heat exchanger 24 or the oxidant heat exchanger 40 to transfer heat to either the feedstock 16 or the oxidant 34.

Moreover, mass flow rate of the feedstock 16, the water 17, and the co-fuel 26, are each controlled by fluid flow devices such as valves, pumps, or other devices which regulate the flow of fluid. In a preferred embodiment, the flow of the feedstock 16, the water 17, and the co-fuel 26, are regulated by variable flow rate pumps 62, 64, 66, respectively, which are connected to the controller 12. As discussed in greater detail below, the controller 12 adjusts the mass flow rate for the co-fuel 26, the water 17, and either the feedstock 16 or the oxidant 34 as needed to implement the present method for on-line monitoring of a SCWO process. In particular, the mass flow rate of either the feedstock 16 or the oxidant 34 is manually entered by an operator of the SCWO processing system 10. As a result, the controller 12 optimizes the mass flow rate of the co-fuel 26, the water 17, and one of the feedstock 16 and the oxidant 34 based on the manually entered mass flow rate of the other of the feedstock 16 and the oxidant 34. In a preferred embodiment, the mass flow rate of the feedstock 16 is manually entered and the mass flow rate of the oxidant 34, the water 17, and the co-fuel 26 are optimized by the controller 12. Additionally, the mass flow rate of the water 17 and the feedstock 16 is measured by the feedstock flow rate sensor 20.

With the data relayed from the various sensors and mass flow rate meters in the SCWO processing system 10, the controller 12 calculates the COD for the feedstock 16 at a given time. Specifically, the controller 12 receives the following inputs: the residence time $\tau$; the mass flow rates of the feedstock 16, the water 17 if added separately, the co-fuel 26, and the oxidant 34 at time $t_0$; and either or both of the mass or volumetric flow rate, temperature, and oxygen content of the gas effluent stream 54 at time $t_0+\tau$. Additionally, assuming complete oxidation takes place within the SCWO reactor 14, no COD for the gas effluent stream 54, and the COD is well known for the given co-fuel 26, the controller 12 calculates the COD for the feedstock 16. The assumption that there is no COD for the gas effluent stream 54 is based on the assumption of a one hundred percent conversion rate within the SCWO reactor 14. This calculation is summarized by the following equation:

$$OMF\,\dot{m}_{Ox}(t_0) - \dot{m}_{FD}(t_0)COD_{FD}(t_0) - \dot{m}_{CF}(t_0)COD_{CF}(t_0) = \tag{1}$$

$$\dot{Q}_G(t_0 + \tau)\frac{1}{V_M(t_0 + \tau)}O_{2_G}(t_0 + \tau)M_{O_2}$$

In equation (1) above, the indexes FD, CF, Ox and G stand respectively for the feedstock 16, the co-fuel 26, the oxidant 34, and the gas effluent stream 54; OMF stands for the oxygen mass fraction in the oxidant 34; $\dot{m}_*$ stands for the mass flow rate of stream $*$ (kg/h); $\dot{Q}_G$ stands for the volumetric flow rate of the gas effluent stream 54 ($m^3$/h); $O_{2_G}$ stands for the oxygen volumetric concentration of the gas effluent stream 54 (mol. %); $V_M$ stands for the molar volume of the gas effluent stream 54 ($m^3$/mol); $M_{O_2}$ stands for oxygen molar mass (kg/mol); $\tau$ stands for the system residence time (s); and $t_0$ stands for the timestamp to which the COD values refer. When air is the oxidant 34, the OMF is 0.233.

Using equation (1), the controller 12 calculates at a time to +T what the feedstock 16 COD was at time $t_0$. In one embodiment, once the controller 12 calculates the COD for the feedstock 16, the controller 12 adjusts the mass flow rate for the oxidant 34 to achieve the preferred COD value for the given feedstock 16.

In a similar manner, the HV is correlated to the following measurable parameters: the oxidant 34 inlet temperature, pressure, and mass flow rate; the feedstock 16 inlet temperature, pressure, and mass flow rate; the heat losses from the SCWO reactor 14; the heat lost between the heat exchangers 24, 40 and the SCWO reactor 14; and the type of the feedstock 16 being provided to the SCWO reactor 14. It is contemplated that instead of the HV, that the Higher Heating Value (HHV), the Lower Heating Value (LHV), or any version of the Heating Value (HV) is used as is known in the art. Specifically, the HV refers to the energy released during the oxidation of the feedstock in SCWO conditions.

As illustrated by FIG. 2, the HV for a given type of feedstock 16 is calculable with the measured temperatures, pressures and mass flow rates of both the oxidant 34 and the feedstock 16. Additionally, the heat loss for the SCWO reactor 14 and the heat loss between the heat exchangers 24, 40 and the SCWO reactor 14 is preferably determined. The heat losses are measured through calibration, and specifically by adding a feedstock 16 with a known calorific value HV, so that there is an expected reacted temperature. Then, the actual reacted temperature is measured at the end of the SCWO reactor 14. The difference between the two temperatures is used to quantify the heat losses. With the heat losses, and the measured values, the controller 12 calculates the HV for a given feedstock 16. Assuming a complete oxidation reaction, the energy balance on the SCWO reactor 14 is represented with the following equation:

$$(\dot{m}_O + \dot{m}_{FD})h(x_i, T_R, P) = \dot{m}_O h(x_i, T_O, P) + \dot{m}_{FD}h(x_i, T_{FD}, P) + \dot{m}_{FD}HV - \Phi \qquad (2)$$

In equation (2) above, h stands for the specific enthalpy function (kJ/kg); $x_i$ stands for the mass fraction of compound i, where i varies over the list of all the compounds; $T_O$ stands for the oxidant 34 temperature at reactor inlet (° C.); $\dot{m}_O$ stands for the oxidant 34 mass flow rate (kg/s); $T_{FD}$ stands for the feedstock 16 temperature at reactor inlet (° C.); $\dot{m}_{FD}$ stands for the feedstock 16 mass flow rate (kg/s); P stands for pressure (psi); HV stands for the feedstock 16 Heating Value (MJ/kg); and $\Phi$ stands for the heat losses (kW) within the SCWO reactor 14 reactor and between SCWO reactor 14 and the heat exchangers 24, 40.

Importantly, the specific enthalpy function is a product of the mass fraction, temperature, and pressure of the compound at issue. As the mass fraction, temperature, and pressure are measured for the feedstock 16, the co-fuel 26, and the oxidant 34, the HV of the feedstock 16 is the only variable that is left in equation (2). In this way, the controller 12 is able to calculate the feedstock 16 HV based on the values provided by the sensors and mass flow rate meters in the SCWO processing system 10.

Further, calculation of the HV for the feedstock 16 is optionally extended to more than one SCWO reactor 14 or more than one SCWO reactor 14 section. Importantly, being able to quickly estimate a given feedstock's 16 HV based only on temperature, pressure and mass flow rate values provides the ability to respond rapidly to a sudden surge in calorific value or to adjust the oxidant 34 to feedstock 16 ratio. Further, it is possible to derate the SCWO processing system 10 to maintain the reactor temperature within acceptable limits.

Another feature of the present disclosure is the ability to incorporate machine learning into the determination of the HV for a given feedstock 16. In particular, with the measured values for the temperature, pressure, mass flow rate and composition of the feedstock 16, the co-fuel 26, and the oxidant 34 for each section of the SCWO reactor 14, as well as the reacted temperatures within the SCWO reactor 14, it is possible to train a model on a known HV for a particular feedstock 16 and later use that model to estimate an unknown feedstock 16 HV for a given sets of parameters. Importantly, the use of machine learning in this manner would remove the need to quantify the heat losses from the SCWO reactor 14 or the heat lost between the heat exchangers 24, 40 and the SCWO reactor 14 since these heat losses would be embedded in the model. Additionally, the use of machine learning would also remove the need to calculate the specific enthalpies' values, as those would also be embedded in the model.

Figure 3:
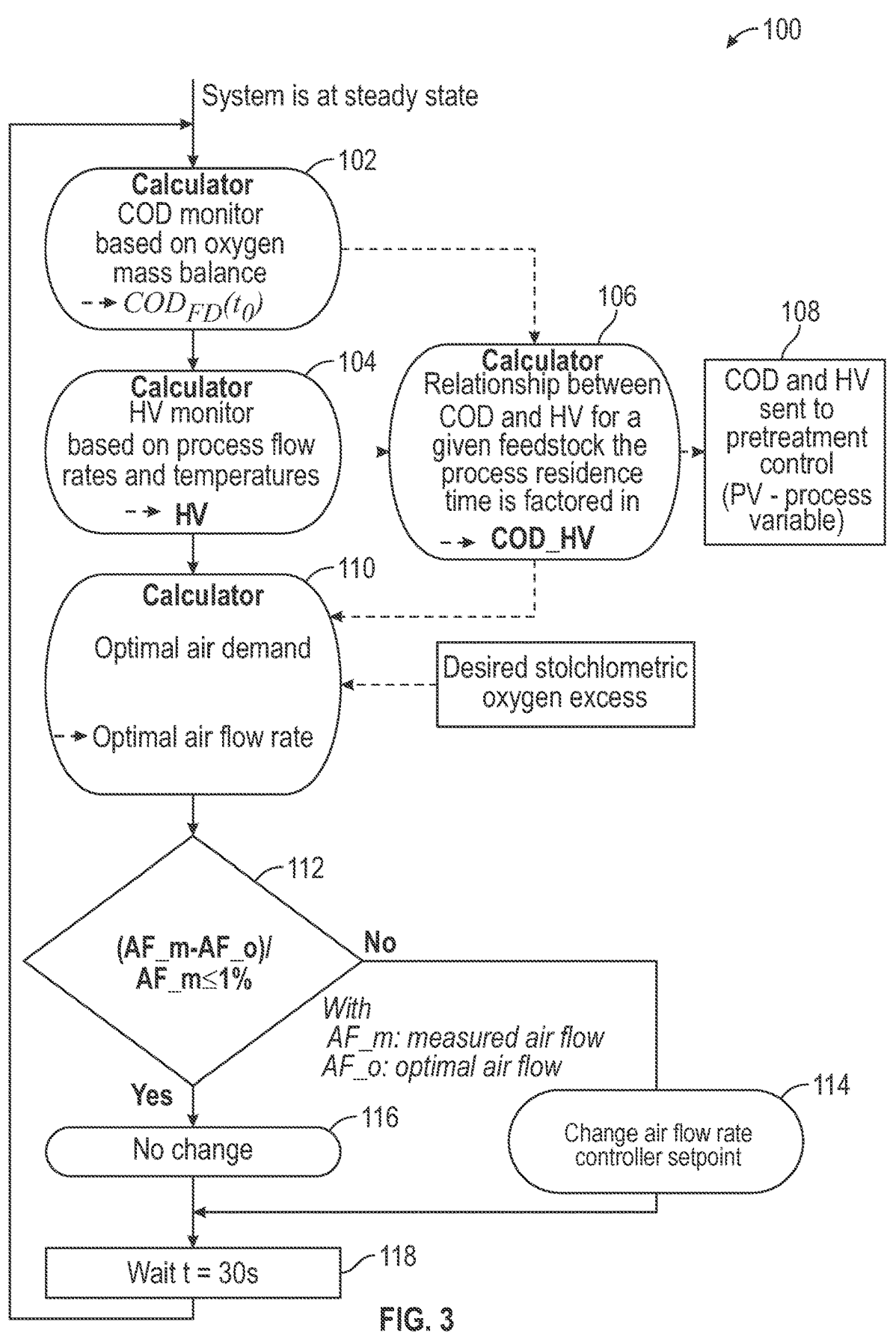
FIG. 3 is a decision flow diagram showing the control philosophy for the method for on-line monitoring of a SCWO process using Chemical Oxygen Demand (COD) and Heating Value (HV) of feedstock.

Referring now to FIG. 3, the present method for on-line monitoring of a SCWO process for monitoring Chemical Oxygen Demand (COD) and Heating Value (HV) of feedstock 16 is generally labeled 100, and includes a step 102 of determining the COD for the feedstock 16 directly based on oxygen mass balance. The method 100 operates on the SCWO processing system 10 which has a fixed flow rate for either the oxidant 34 or the feedstock 16. In a preferred embodiment of the method 100, the flow rate of the feedstock 16 is fixed and the flow rate of the oxidant 34 is adjusted by the method 100.

Specifically, the $COD_{FD}(t_0)$, which is the feedstock 16 COD value determined by equation (1), is calculated at a time to. Accordingly, the $COD_{FD}(t_0)$ illustrates what the feedstock 16 COD was at the time to even though the calculation is performed after the system's residence time $\tau$. In other words, the $COD_{FD}(t_0)$ is calculated at time $t_0 + \tau$.

Additionally, the method 100 includes a step 104 of calculating the feedstock 16 HV with equation (2), which uses the mass flow rates and temperatures of the various inputs and outputs of the SCWO processing system 10, as well as the heat losses within the SCWO processing system 10. Unlike the COD calculated directly from the oxygen mass balance, which takes place after the system residence time, the feedstock 16 HV is measured with little to no time lag. While the step 104 is illustrated with the HV, it is understood that the HHV, LHV, or any version of the HV is optionally used for the method 100. Regardless of the HV used, the corresponding COD-HV derived by the method 100 provides the desired results based on the relative HV variations.

Once the steps 102 and 104 have been completed, the method 100 includes a step 106, where the calculated HV and COD for the given feedstock 16 are correlated, thereby providing a COD-HV correspondence, which is the relationship between the HV and COD for the feedstock 16. The COD-HV relationship is optionally expressed in the form of a table, a function, or other ways as is known in the art. The relationship between the HV and the COD is determined by direct matching taking the residence time into account. For example, a table is created with a COD point every 30 seconds, and a HV value at every 30 seconds, with the system residence time being generally between 300 and 600 seconds. Taking 300 seconds as an example, the relationship is based on matching COD value at times x+300 seconds with HV values at times x. In particular, the COD calculation based on oxygen mass balance is performed on the gas effluent stream 54, which only reaches the gas effluent stream oxygen sensor 58 after the system residence time (300 s here). As time passes, a rolling average is used, where the rolling period is adjusted based on experience.

Moreover, within the step 106, the controller 12 optionally isolates the contribution of the co-fuel 26 to the HV and COD from the contribution of the feedstock 16, to keep the COD-HV real-time relationship of the feedstock 16 updated.

In turn a step 108 involves sending the HV value to the controller 12, such that the controller 12 adjusts the pretreatment control of the feedstock 16 based on the HV value of the feedstock 16. Examples of pretreatment that are applied to the feedstock 16 include dewatering, evaporative or membrane concentration, preheating through the feedstock heat exchanger 24, or other pretreatments as are known in the art.

In addition, a step 110 uses the COD-HV value to determine the optimal oxidant 34 mass flow rate for the SCWO processing system 10.

In particular, the optimal oxidant 34 mass flow rate is calculated to provide the desired stoichiometric oxygen excess in the SCWO reactor 14. This parameter is set by the operator of SCWO processing system 10, and ranges from 5% to 35% excess in some examples. Specifically, the SCWO reactor 14 requires a certain amount of oxygen to completely mineralize the organic material in the feedstock 16. Mineralization is the conversion of organic material to water and $CO_2$. Complete mineralization of the organic material within the feedstock 16 helps prevent the creation of harmful byproducts of the SCWO processing system 10, such as CO, $CH_4$ and VOCs. Therefore, the SCWO processing system 10 needs sufficient oxygen to achieve complete mineralization of the feedstock 16. However, providing too much oxygen to the SCWO reactor 14 results in additional power consumption and wear on the compressor 35.

Also, with the determination of the COD of the feedstock 16 and the co-fuel 26, the desired oxygen amount is calculated using the COD value multiplied by both the flow rate and provided excess factor. For example, if pure oxygen is used as the oxidant 34, a lower mass flow rate of the oxidant 34 is used. Importantly, the controller 12 determines the optimal oxidant 34 mass flow rate frequently to allow real time responses, for example every 30 seconds.

Similarly, when the feedstock 16 is outside of the allowable range of HVs, typically in the range of 1.5-3 MJ/kg, the controller 12 determines the amount of the co-fuel 26 or the water 17 needed to accommodate the excess or lack of energy within the feedstock 16.

After the optimal oxidant 34 mass flow rate is calculated, the method 100 includes a step 112 where the measured mass flow rate of the oxidant 34 is compared to the optimal flow rate of the oxidant 34 calculated in step 110. In particular, the difference between the measured and optimal mass flow rate of the oxidant 34 is divided by the measured mass flow rate of the oxidant 34 to be normalized. If this value is greater than one percent which may vary to suit the application, then the controller 12 initiates a step 114 of the method 100, where the oxidant 34 mass flow rate is adjusted to reach the optimal mass flow rate of the oxidant 34. Alternatively, if the value calculated in step 112 is less than or equal to one percent, then the method 100 proceeds to step 116, where no change is initiated in the SCWO processing system 10.

Likewise, within the step 112, the controller 12 determines whether the feedstock 16 is within the acceptable range of calorific values. If the feedstock 16 is within acceptable limits, the method 100 proceeds to step 116 where no change is initiated. However, if the feedstock 16 is outside the acceptable range of calorific values, the method 100 moves to step 114 where the flow rate of either co-fuel 26 or water 17 is adjusted to bring the calorific value of the mixture of the feedstock 16, the water 17, and the co-fuel 26 within acceptable limits Finally, a step 118 involves waiting a predetermined amount of time before restarting the method 100. For example, the method 100 waits 30 seconds before initiating step 102. However, other intervals are appropriate for step 118 as is known in the art.

Additionally, in an alternate embodiment, the controller 12 receives at least one measured value for at least one parameter indicative of the oxidation process within the SCWO reactor 14. The list of parameters which form the at least one first measured value include: temperature, pressure, reaction rate, mass flow rate, oxygen percentage, or combinations thereof. These measured values are provided by the various sensors in the SCWO processing system 10.

Then, the controller 12 compares the at least one measured value with at least one optimal value which indicates the desired condition of the oxidation process within the SCWO reactor 14. The optimal values are stored in a predefined memory location (not shown) and are dynamic. It is understood that the at least one optimal value and the at least one measured value are optionally associated with the same parameter of the SCWO processing system 10.

Based on the comparison, the controller 12 decides whether or not to adjust the mass flow rates for the inputs of the SCWO reactor 14 so as to adjust the at least one measured value. If the controller 12 decides to make an adjustment, the controller 12 sends instructions to adjust the mass flow rate for the given input of the SCWO reactor 14 that needs adjustment to effect the desired change. For example, if there is a deficient amount of oxygen within the SCWO reactor, the controller 12 increases the mass flow rate of the oxidant 34 so as to achieve the desired amount of oxygen in the SCWO reactor 14. Alternatively, if there is insufficient energy as evidenced by low temperatures or HVs, in the SCWO reactor 14, the controller 12 increases the mass flow rate of the co-fuel 26, thereby providing additional energy to the SCWO reactor 14. Subsequently, increasing the co-fuel 26 will result in a change of mixture HV and will in turn lead to increase in the mass flow rate of the oxidant 34 through the HV-derived COD. In yet another embodiment, the controller 12 dynamically adjusts the at least one optimal value based on the calculated COD and HV values for the given feedstock 16.

Another feature of the present disclosure includes a thermodynamic modeling engine which is optionally run in parallel with the method 100. In particular, the thermodynamic modeling engine derives the streams enthalpies needed to obtain the HV reading based on operational parameters (temperature, pressure, flow rates). The modeling shows how the theoretical HV and theoretical COD match well with equations (1) and (2). In particular, the COD reading is derived based on equation (1) and compared with the theoretical COD. The theoretical COD is obtained by direct measurement of the feedstock. Then, those two values and real-time direct measurements are used to enhance the performances of the SCWO process 10.

To illustrate the effectiveness of the method 100, the inventors developed a simulated model of the SCWO process 10, as shown in FIG. 1. Through the use of a thermodynamic package, following model assumptions and inputs, the inventors were able to predict stream properties following the oxidation of a model compound in supercritical water including stream enthalpies and stream temperatures. In the simulations, a solution of isopropyl alcohol (IPA) in water 17 was used as the feedstock 16.

The inventors ran two simulations based on the simulated model of the SCWO process 10. For each simulation, the following inputs were required: the operating pressure; the feedstock 16 mass flow rate; the feedstock 16 inlet temperature after preheating; the feedstock 16 composition (IPA wt. % in water); the co-fuel 26 type and composition; the target HV for the feedstock 16 and the co-fuel 26 mixture or SCWO reactor 14 outlet target temperature; the air inlet temperature after preheating; the oxygen excess target; and the oxidation reaction stoichiometry. Based on the inputs, the model adjusted the oxidant 34 mass flow rate to match the oxygen excess target and determined the feedstock 16 COD and HV based on equations (1) and (2).

In the first simulation, the HV of the feedstock 16 quickly decreases by a small percentage. In this simulation, the temperature within the SCWO reactor 14 remained within acceptable temperatures, however oxygen excess was unnecessarily high until the COD reading was updated through the COD-HV correlation. The HV and COD-HV correspondence table was used to generate the HV-derived COD value. Then, the simulation reduced the compressor 35 speed and matched the oxygen excess even during the residence time duration. As a result, the oxidant 34 flow rate is adjusted almost immediately rather than waiting for the gas effluent stream 54 to reach the gas effluent stream oxygen sensor 58, which would take the SCWO processing system 10 residence time which is typically in excess of several minutes.

The first simulation demonstrates how the HV calculation loop combined with the HV-COD real-time relationship and the HV-derived COD is used to fine tune the compressor 35 power demand quickly after a variation in feedstock 16 characteristics, improving energy efficiency. Table 1 below shows the model inputs for the first simulation for three difference situations, namely under the initial condition of the SCWO reactor 14, when a slight HV drop of the feedstock 16 occur and the air supply is not adjusted according to method 100, and when a slight HV drop of the feedstock 16 occur and the air supply is adjusted according to method 100. For the purpose of the following simulations, the residence time was chosen to be 5 minutes.

Table 2 shows the model outputs from the first simulation, including the compressor 35 power used by the SCWO processing system 10. Further, Table 3 shows the calculation of the COD from the oxygen mass balance, and the COD derived from the COD-HV relationship.

For the first simulation shown in Table 1, the following inputs remained constant: the feedstock 16 inlet flow rate and initial temperature, the reactor heat losses, and the vent temperature and pressure.

TABLE 1

| Details | Feed IPA_wt_pct (wt. %) Feedstock IPA concentration | AirFl (kg/h) Air inlet flow rate | T_air_hot (° C.) Air reactor inlet temperature |
|---|---|---|---|
| Initial conditions | 8.10% | 231.2 | 550.0 |
| Slight HV drop - air supply non adjusted (within 5 minutes of change) | 7.50% | 231.2 | 550.0 |
| Slight HV drop - air supply non adjusted (after 5 minutes of change) | 7.50% | 231.2 | 550.0 |
| Slight HV drop - air supply adjusted | 7.50% | 214.0 | 550.0 |

TABLE 2

| Details | T_react (° C.) Reactor outlet temperature | Reacted enthalpy (kJ/kg) Reactor outlet specific enthalpy | Feed hot enthalpy (kJ/kg) Feedstock reactor inlet specific enthalpy | Theoretical HV (MJ/kg) Feedstock theoretical HV |
|---|---|---|---|---|
| Initial conditions | 600.4 | 837.1 | −1307.1 | 2.53 |
| Slight HV drop - air supply non adjusted (within 5 minutes of change) | 548.8 | 739.7 | −1316.7 | 2.34 |
| Slight HV drop - air supply non adjusted (after 5 minutes of change) | 548.8 | 739.7 | −1316.7 | 2.34 |
| Slight HV drop - air supply adjusted | 550.1 | 746.3 | −1316.7 | 2.34 |

| | Theoretical COD (g O2/kg) | | | |
|---|---|---|---|---|
| Feedstock theoretical COD | Theoretical stoichiometric oxygen excess (%) Oxygen excess | Vent volumetric flow rate (m3/h) Vent volumetric flow rate | Vent $O_2$ molar fraction Vent $O_2$ molar fraction | Compressor power (kW) Compressor power (kW) |
| 194.4 | 9.8 | 254.5 | 1.6% | 59.7 |
| 180.0 | 18.6 | 255.8 | 1.6% | 59.7 |
| 180.0 | 18.6 | 255.8 | 2.8% | 59.7 |
| 180.0 | 9.8 | 235.7 | 1.6% | 55.3 |

TABLE 3

| | COD Calculation | |
|---|---|---|
| Details | Oxygen stoichiometric excess Based on O2 mass balance and assuming complete oxidation | Feedstock calculated COD (g/kg) Calculated feedstock COD - Equation (1) |
| Nominal/initial case | 10% | 194.1 |
| Slight HV drop - air supply non adjusted (within 5 minutes of change) | 10% | 194.1 |
| Slight HV drop - air supply non adjusted (after 5 minutes of change) | 19% | 179.7 |
| Slight HV drop - air supply adjusted | 10% | 179.7 |

| | COD Calculation Continued | |
|---|---|---|
| | HV calculation HV-derived COD (g/kg) | COD to HV relationship |
| Based on HV and COD to HV relationship | Feedstock HV (MJ/kg) Calculated feedstock HV (equation (1)) | COD to HV ratio (g/MJ) Rolling average with high weight of past values, to change slowly in time (unless co-fuel is added) |
| 194.1 | 2.5 | 76.8 |
| 179.7 | 2.3 | 76.8 |
| 179.7 | 2.3 | 76.8 |
| 179.7 | 2.3 | 76.8 |

As shown in Table 2, the HV calculation loop combined with the HV-COD real-time relationship and the HV-derived COD helped improve the amount of oxidant 34 supplied by the compressor 35, thereby reducing power consumption by approximately 7% for the duration of the residence time.

In the second simulation, the HV of the feedstock 16 quickly increases by a large percentage. Relying on the COD based on oxygen mass balance would result in the SCWO reactor 14 running oxygen-lean or even in default of oxygen until the COD of the feedstock 16 is updated. This would not occur until the reacted fluid reaches the gas effluent oxygen sensor 58, resulting in the formation of harmful by-products such as CO, $CH_4$ and VOCs and poor treatment performances during that transition period. Specifically, complete mineralization of the organic material cannot be achieved unless there is sufficient oxygen excess.

Since the SCWO reactor 14 would be running oxygen-lean, the COD based on oxygen mass balance would even be inaccurate. Accordingly, it would take several iterations, each of which would last for at least the system residence time, before the COD based on oxygen mass balance is the actual COD.

Through the use of the HV calculation and HV-derived COD, it becomes possible to quickly adjust the rate at which oxidant 34 is supplied to the SCWO reactor 14 as well as adjust the water 17 flow rate, to maintain the HV of the feedstock 16 in an acceptable range and to maintain the excess $O_2$ within the acceptable range. The adjustment will take several iterations since complete oxidation cannot be achieved with a sudden increase in HV, but each iteration will last seconds instead of minutes.

In the second simulation, the HV was used to control the addition of the water 17, and the HV-derived COD was used to control the supply of the oxidant 34, when the HV of the feedstock 16 increased suddenly. As such, the SCWO reactor 14 maintained the proper operating conditions and high treatment performance.

Table 4 below shows the model inputs for the second simulation under four different situations, namely under the initial condition of the SCWO reactor 14, when a significant HV increase of the feedstock 16 occurs and neither the water 17 nor the oxidant 34 are adjusted, and when a significant HV increase of the feedstock 16 occurs and the supply of the water 17 is adjusted but the supply of oxidant 34 is not adjusted, and when a significant HV increase of the feedstock 16 occurs and both the water 17 and the oxidant 34 are adjusted according to method 100. For the purpose of the simulation, the residence time was chosen to be 5 minutes.

Table 5 shows the model outputs from the second simulation, including the amount of the water 17 and the oxidant 34 supplied to the SCWO reactor 14. Further, Table 6 shows the calculation of the COD from the oxygen mass balance, and the HV derived COD determined based on the COD-HV relationship.

For the second simulation shown in Table 4, the following inputs remained constant: the feedstock 16 inlet flow rate and initial temperature, the reactor heat losses, and the vent temperature and pressure.

TABLE 4

| Details | Feed IPA_wt_pct (wt. %) Feedstock IPA concentration | Air Fl (kg/h) Air inlet flow rate | Water flow (kg/h) Water inlet flow rate | T_air_hot (° C.) Air reactor inlet temperature |
|---|---|---|---|---|
| Initial conditions | 8.10% | 231.2 | 0.0 | 550.0 |
| Significant HV increase - air supply NOT adjusted (within 5 minutes of change) | 9.50% | 231.2 | 0.0 | 550.0 |
| Significant HV increase - air supply NOT adjusted (after 5 minutes of change) | 9.50% | 231.2 | 0.0 | 550.0 |
| Significant HV increase - water ONLY adjusted | 9.50% | 231.2 | 46.4 | 550.0 |
| Significant HV increase - water AND air adjusted | 9.50% | 271.1 | 46.4 | 550.0 |

TABLE 5

| Details | T_react (° C.) Reactor outlet temperature | Feedstock HV theoretical (MJ/kg) Feedstock HV theoretical (MJ/kg) | Feedstock COD theoretical (g O₂/kg) Feedstock theoretical COD |
|---|---|---|---|
| Initial conditions | 600.2 | 2.53 | 194.4 |
| Significant HV increase - air supply NOT adjusted (within 5 minutes of change) | 671.8 | 2.97 | 228.0 |
| Significant HV increase - air supply NOT adjusted (after 5 minutes of change) | 671.8 | 2.97 | 228.0 |
| Significant HV increase - water ONLY adjusted | 502.6 | 2.97 | 228.0 |

TABLE 5-continued

| Significant HV increase - water AND air adjusted | 542.2 | 2.97 | 228.0 |
|---|---|---|---|

| | Theoretical stoichiometric oxygen excess (%) | | |
|---|---|---|---|
| Oxygen excess | Vent volumetric flow rate (m3/h) Vent volumetric flow rate | Vent O$_2$ molar fraction Vent O$_2$ molar fraction | Compressor power (kW) Compressor power (kW) |
| 9.8 | 254.5 | 1.6% | 59.7 |
| −6.4 | 253.5 | 1.6% | 59.7 |
| −6.4 | 253.5 | 0.0% | 59.7 |
| −6.4 | 253.5 | 0.0% | 59.7 |
| 9.8 | 298.5 | 1.6% | 70.0 |

TABLE 6

| | COD Calculation | |
|---|---|---|
| Details | Feedstock COD calculated (g/kg) Calculated feedstock COD - Equation (1) | Oxygen stoichiometric excess Based on O$_2$ mass balance and assuming complete oxidation |
| Initial conditions | 194.0 | 10% |
| Significant HV increase - air supply NOT adjusted (within 5 minutes of change) | 194.0 | 10% |
| Significant HV increase - air supply NOT adjusted (after 5 minutes of change) | 213.4 | 0% |
| Significant HV increase - water ONLY adjusted | 213.3 | 0% |
| Significant HV increase - water AND air adjusted | 227.5 | 10% |

| | COD Calculation Continued | |
|---|---|---|
| Calculated feedstock HV (Equation (2)) | HV calculation Feedstock HV-derived COD (g/kg) Feedstock HV calculated (MJ/kg) Calculated feedstock HV (Equation (2)) | COD to HV relationship COD to HV ratio (g/MJ) Rolling average with high weight of past values, to change slowly in time (unless co-fuel is added) |
| 194.0 | 2.5 | 76.8 |
| 213.4 | 2.8 | 76.8 |
| 213.4 | 2.8 | 76.8 |
| 213.3 | 2.8 | 76.8 |
| 227.5 | 3.0 | 76.8 |

The second simulation only included a single iteration for the method 100. However, since the increase in HV of the feedstock 16 was significant, the SCWO reactor 14 in the simulation ran in default of oxygen for some time. Accordingly, complete oxidation was not achievable, and the HV reading was partly inaccurate. While multiple iterations would be necessary for the method 100, the results from the second simulation demonstrate the benefits of the method 100 in addressing a significant increase in the HV of a feedstock 16.

As demonstrated by the simulations, by providing flow rates, temperature and vent gas composition monitoring, the SCWO system 10 is able to estimate the COD of the feedstock 16 with minimal delay. The COD directly calculated from the oxygen mass balance is accurate at steady state but slow to react to changes because of the system 10 residence time, typically in excess of several minutes. However, the HV calculation is much faster to react to change.

As discussed above, the SCWO system 10 uses the direct COD calculation with the HV calculation to generate a COD-HV relationship, and the COD-HV relationship is used to generate a HV-derived COD. This HV-derived COD is used for fine tuning the supply of oxidant 34 to the SCWO reactor 14 during transients. Maintaining a real-time COD-HV relationship, with periodical but sufficiently slow updates, helps maintain the accuracy of the HV-derived COD estimate.

While a particular embodiment of the present method for on-line monitoring of a SCWO process for monitoring Chemical Oxygen Demand (COD) and Heating Value (HV) of feedstock has been described herein, it will be appreciated by those skilled in the art that changes and modifications may be made thereto without departing from the invention in its broader aspects and as set forth in the following claims.

The invention claimed is:

1. A system for on-line monitoring of a supercritical water oxidation (SCWO) process, said system comprising:
    an SCWO reactor;
    a feedstock supply line which supplies a feedstock to said SCWO reactor;
    an oxidant supply line which supplies an oxidant to said SCWO reactor;
    at least one sensor which measures at least one parameter of said feedstock and said oxidant;
    a controller which determines a Chemical Oxygen Demand (COD) and a Heating Value (HV) of said feedstock based on said at least one parameter, such that said controller adjusts the amount of said oxidant supplied to said SCWO reactor based upon said COD and said HV of said feedstock;
    a co-fuel supply line which supplies a co-fuel to said SCWO reactor; and
    at least one co-fuel supply line sensor which measures at least one parameter of said co-fuel, wherein said controller adjusts the amount of said co-fuel based on said HV of said feedstock, wherein said controller determines said COD of said feedstock based on the following Equation 1 and said controller determines said HV of said feedstock based on the following Equation 2:

the following equation 1 is:

$$OMF \, \dot{m}_{Ox}(t_0) - \dot{m}_{FD}(t_0)COD_{FD}(t_0) - \dot{m}_{CF}(t_0)COD_{CF}(t_0) =$$

$$\dot{Q}_G(t_0 + \tau)\frac{1}{V_M(t_0 + \tau)}O_{2_G}(t_0 + \tau)M_{O_2}$$

and, the following Equation 2 is:

$$(\dot{m}_o + \dot{m}_{FD})h(x_i, T_R, P) = \dot{m}_o h(x_j, T_o, P) + \dot{m}_{FD} h(x_k, T_{FD}, P) + \dot{m}_{FD} HV - \Phi \quad 5$$

where, the indexes FD, CF, Ox and G stand respectively for said feedstock, said co-fuel, said oxidant, and a gas effluent stream of said SCWO reactor; OMF stands for the oxygen mass fraction in said oxidant; $\dot{m}_*$ stands for the mass flow rate of stream *; $COD_*$ stands for said COD of stream *; $\dot{Q}_G$ stands for the volumetric flow rate of said gas effluent stream; $O_{2_G}$ stands for the oxygen volumetric concentration of said gas effluent stream; $V_M$ stands for the molar volume of said gas effluent stream; $M_{O_2}$ stands for oxygen molar mass; $\tau$ stands for the system residence time; $t_0$ stands for the timestamp to which said COD values refer; h stands for the specific enthalpy function; $x_i$ stands for the mass fraction of compound i, where i varies over the list of all the compounds; $T_*$ stands for the temperature of stream *; P stands for pressure; and $\Phi$ stands for the heat losses within said SCWO system.

2. The system of claim 1, wherein said COD is determined based on an oxygen mass balance calculation performed by said controller, and said controller uses said COD and said HV of said feedstock to determine a COD-HV relationship for said feedstock.

3. The system of claim 2, wherein said controller uses said COD-HV relationship to generate a HV derived COD, wherein said HV derived COD is used by said controller to adjust the amount of said oxidant supplied to said SCWO reactor.

4. The system of claim 1, further comprising:

at least one heat exchanger which transfers heat from an effluent of said SCWO reactor to at least one of said oxidant and said feedstock.

5. The system of claim 1, wherein said at least one sensor includes:

a mass flow rate meter;

a mass flowmeter;

a temperature sensor;

a pressure sensor; and an oxygen sensor, wherein said at least one sensor measures at least one parameter for at least one of:

said feedstock;

said oxidant; and an SCWO reactor effluent.

6. The system of claim 1, wherein said controller calculates said COD and said HV of said feedstock periodically, said controller iteratively adjusting the supply of said oxidant.

7. The system of claim 1, further comprising:

a phase separator which separates an effluent of said SCWO reactor into a liquid effluent stream and said gas effluent stream, wherein said at least one sensor includes at least one of:

a gas effluent stream flow rate meter;

a gas effluent stream oxygen sensor; and a gas effluent stream temperature sensor.

8. The system of claim 1, further comprising:

a supply regulator for said oxidant, wherein said oxidant supply regulator is connected to said controller, and said controller adjusts the amount of said oxidant supplied to said SCWO reactor by sending a control signal to said oxidant supply regulator.

9. A method for an on-line monitoring of a supercritical water oxidation (SCWO) process, said method comprising:

supplying a feedstock and an oxidant to an SCWO reactor;

measuring at least one parameter of said feedstock and said oxidant with at least one sensor;

determining, with a controller, a Chemical Oxygen Demand (COD) and a Heating Value (HV) of said feedstock based on said at least one parameter;

adjusting the supply of said oxidant based on said COD and said HV of said feedstock;

supplying a co-fuel to said SCWO reactor; and adjusting the supply of said co-fuel based on said HV of said feedstock, wherein said controller adjusts the amount of said co-fuel based on said HV of said feedstock, wherein said controller determines said COD of said feedstock based on the following Equation 1 and said controller determines said HV of said feedstock based on the following Equation 2:

the following equation 1 is:

$$OMF \dot{m}_{Ox}(t_0) - \dot{m}_{FD}(t_0)COD_{FD}(t_0) - \dot{m}_{CF}(t_0)COD_{CF}(t_0) =$$

$$\dot{Q}_G(t_0 + \tau)\frac{1}{V_M(t_0 + \tau)}O_{2_G}(t_0 + \tau)M_{O_2}$$

and, the following Equation 2 is:

$$(\dot{m}_o + \dot{m}_{FD})h(x_i, T_R, P) = \dot{m}_o h(x_j, T_O, P) + \dot{m}_{FD} h(x_k, T_{FD}, P) + \dot{m}_{FD} HV - \Phi$$

where, the indexes FD, CF, Ox and G stand respectively for said feedstock, said co-fuel, said oxidant, and a gas effluent stream of said SCWO reactor; OMF stands for the oxygen mass fraction in said oxidant; $\dot{m}_*$ stands for the mass flow rate of stream *; $COD_*$ stands for said COD of stream *; $\dot{Q}_G$ stands for the volumetric flow rate of said gas effluent stream; $O_{2_G}$ stands for the oxygen volumetric concentration of said gas effluent stream; $V_M$ stands for the molar volume of said gas effluent stream; $M_{O_2}$ stands for oxygen molar mass; $\tau$ stands for the system residence time; $t_0$ stands for the timestamp to which said COD values refer; h stands for the specific enthalpy function; $x_i$ stands for the mass fraction of compound i, where i varies over the list of all the compounds; $T_*$ stands for the temperature of stream *; P stands for pressure; and $\Phi$ stands for the heat losses within said SCWO system.

10. The method of claim 9, wherein said COD is determined based on an oxygen mass balance calculation performed by said controller, and said controller uses said COD and said HV of said feedstock to determine a COD-HV relationship for said feedstock.

11. The method of claim 10, wherein said controller uses said COD-HV relationship to generate a HV derived COD, wherein said HV derived COD is used by said controller to adjust the amount of said oxidant supplied to said SCWO reactor.

12. The method of claim 9, further comprising:

preheating at least one of said oxidant and said feedstock using a heat exchanger, wherein said heat exchanger transfers heat from an effluent of said SCWO reactor to at least one of said oxidant and said feedstock.

13. The method of claim 9, wherein said at least one sensor includes:

a mass flow rate meter;

a mass flowmeter;

a temperature sensor;

a pressure sensor; and an oxygen sensor, wherein said at least one sensor measures at least one parameter for at least one of:

said feedstock;

said oxidant; and an SCWO reactor effluent.

14. The method of claim 9, wherein said controller calculates said COD and said HV of said feedstock periodically, said controller iteratively adjusting the supply of said oxidant.

15. The method of claim 9, further comprising:

separating, with a phase separator, an effluent of said SCWO reactor into a liquid effluent stream and said gas effluent stream, wherein said at least one sensor includes at least one of:

a gas effluent stream flow rate meter;

a gas effluent stream oxygen sensor; and a gas effluent stream temperature sensor.

\* \* \* \* \*